(12) United States Patent
Colenbrander

(10) Patent No.: US 12,741,202 B2
(45) Date of Patent: Sep. 22, 2026

(54) SCALABLE DATA CENTER PLATFORM FOR CLOUD GAMING AND METAVERSE

(71) Applicant: Sony Interactive Entertainment Inc., Tokyo (JP)

(72) Inventor: Roelof Roderick Colenbrander, Costa Mesa, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 328 days.

(21) Appl. No.: 17/969,579

(22) Filed: Oct. 19, 2022

(65) Prior Publication Data

US 2024/0131425 A1 Apr. 25, 2024
US 2024/0226730 A9 Jul. 11, 2024

(51) Int. Cl.
*A63F 13/355* (2014.01)
*A63F 13/48* (2014.01)

(52) U.S. Cl.
CPC ............ *A63F 13/355* (2014.09); *A63F 13/48* (2014.09); *A63F 2300/538* (2013.01)

(58) Field of Classification Search
CPC ... A63F 13/355; A63F 13/48; A63F 2300/538
See application file for complete search history.

(56) References Cited

U.S. PATENT DOCUMENTS

2020/0306632 A1* 10/2020 Kolen ..................... A63F 13/79
2022/0060526 A1* 2/2022 Jónsson ................ H04L 67/306
2022/0236978 A1* 7/2022 Yu ....................... G06F 9/45558
2022/0245131 A1* 8/2022 Loeb .......................... G06F 9/54
2023/0084784 A1* 3/2023 Chen ..................... G06F 9/5072
718/104

FOREIGN PATENT DOCUMENTS

CN 111790159 A 10/2020
CN 111190580 B 6/2021
CN 113064712 B 5/2022

OTHER PUBLICATIONS

Intl Search Report & Written Opinion, PCT/US2023/076151, Jan. 30, 2024, 11 pages.

(Continued)

*Primary Examiner* — Ankit B Doshi
(74) *Attorney, Agent, or Firm* — Kilpatrick Townsend & Stockton LLP

(57) ABSTRACT

A method for cloud gaming including receiving a request to instantiate an instance of a video game for a game play of a player. The method including establishing a cloud based game engine for executing game logic of the video game in the instance of the video game. The method including assembling microservices for the cloud based game engine to instantiate the instance of the video game. The method including establishing communication between the cloud based game engine and each of the microservices over a communication fabric. The method including executing the game logic in the instance of the video game using the cloud based game engine based on controller input associated with the game play. The method including monitoring demand for computing resources while executing the instance of the video game. The method including adjusting an allocation of computing resources for the set of microservices based on the demand.

20 Claims, 8 Drawing Sheets

(56) References Cited

OTHER PUBLICATIONS

Mostofi Vahid Mirzaebrahim et al: "Fast and Efficient Performance Tuning of Microservices", 2021 IEEE 14th International Conference on Cloud Computing (Cloud), IEEE, Sep. 5, 2021 (Sep. 5, 2021), pp. 515-520,XP034012975, DOI: 10.1109/CLOUD53861.2021.00067 [retrieved on Oct. 19, 2021].

* cited by examiner

SCALABLE DATA CENTER PLATFORM FOR CLOUD GAMING AND METAVERSE

TECHNICAL FIELD

The present disclosure is related to cloud gaming, and more specifically to a cloud based game engine configured with microservices for executing an application (e.g., a video game, a metaverse application, artificial intelligence, etc.), wherein the cloud based game engine is configured to dynamically expand and contract microservices and/or an allocation of computing resource for those microservices based on a demand for computing resources determined while executing the video game.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop or laptop computers, mobile phones, etc.

In recent years there has been a continual push for online services that allow for cloud gaming in a streaming format between a cloud gaming server and a client connected through a network. The streaming format has increasingly become more popular because of the availability of game titles on demand, the ability to execute more complex games, the ability to network between players for multiplayer gaming, sharing of assets between players, sharing of instant experiences between players and/or spectators, allowing friends to watch a friend play a video game, having a friend join the on-going game play of a friend, and the like.

When performing cloud gaming, a video game is typically designed for execution by a game engine that utilizes a fixed amount of computing resources for an instance of the video game that is executing for a game play of a player. For example, computing resources are allocated by the cloud gaming system to establish and execute the instance of the video game. These computing resources are typically packaged within a unit, such as one designed as a game console, wherein a player is assigned to one of those units for executing a video game for cloud gaming. As video games and their corresponding game plays become more complex, a scene may include increasing numbers of objects over successive frames that eventually become too expensive and/or burdensome to render by the instance of the video game that has a fixed amount of computing resources. In those cases where the rendering engine in the instance of the video game is overtaxed, objects in the corresponding scene may be rendered with lower level of detail, or objects may fade from or be removed from the scene, or rendering of an image frame of the scene may be skipped entirely in an effort to maintain a frame rate that is close to the required frame rate for the video game. In all of these situations, the player is left with a less than realistic gaming experience.

Because traditionally video games are designed for game engines running on a single piece of hardware (e.g., game console or unit), game developers will design video games for the executing environment or existing game engines. As such, video games will be limited by the types of graphics and the use of those graphics that can be rendered to ensure that the game engine can output video frames at an expected frame rate. However, the evolution of video games and video gaming eventually will be constrained by the static allocation of computing resources for existing game engines when executing instances of those video games.

It is in this context that embodiments of the disclosure arise.

SUMMARY

Embodiments of the present disclosure relate to a cloud based game engine configured with microservices for executing an application (e.g., a video game, a metaverse application, artificial intelligence, etc.), wherein the cloud based game engine is configured to dynamically expand and contract microservices and/or an allocation of computing resource for those microservices based on a demand for computing resources determined while executing the application. Data centers provide computing resources interconnected using high speed communication fabrics, wherein the computing resources support supporting one or more cloud based game engines.

In one embodiment, a method for cloud gaming is disclosed. The method including receiving a request to instantiate an instance of a video game for a game play of a player. The method including establishing a cloud based game engine for executing game logic of the video game in the instance of the video game. The method including assembling a set of microservices for the cloud based game engine to instantiate the instance of the video game, wherein the set of microservices is provided an allocation of computing resources. The method including establishing communication between the cloud based game engine and each of the microservices in the set of microservices over a communication fabric. The method including executing the game logic in the instance of the video game using the cloud based game engine based on controller input associated with the game play of the player. The method including monitoring demand for computing resources while performing the executing the instance of the video game. The method including adjusting the allocation of computing resources for the set of microservices based on the demand.

In another embodiment, a non-transitory computer-readable medium storing a computer program for implementing a method for cloud gaming is disclosed. The computer-readable medium including program instructions for receiving a request to instantiate an instance of a video game for a game play of a player. The computer-readable medium including program instructions for establishing a cloud based game engine for executing game logic of the video game in the instance of the video game. The computer-readable medium including program instructions for assembling a set of microservices for the cloud based game engine to instantiate the instance of the video game, wherein the set of microservices is provided an allocation of computing resources. The computer-readable medium including program instructions for establishing communication between the cloud based game engine and each of the microservices in the set of microservices over a communication fabric. The computer-readable medium including program instructions for executing the game logic in the instance of the video game using the cloud based game engine based on controller input associated with the game play of the player. The computer-readable medium including program instructions for monitoring demand for computing resources while performing the executing the instance of the video game. The computer-readable medium including program instructions for adjusting the allocation of computing resources for the set of microservices based on the demand.

In still another embodiment, a computer system is disclosed, wherein the computer system includes a processor and memory coupled to the processor and having stored therein instructions that, if executed by the computer system, cause the computer system to execute a method for cloud gaming. The method including receiving a request to instantiate an instance of a video game for a game play of a player. The method including establishing a cloud based game engine for executing game logic of the video game in the instance of the video game. The method including assembling a set of microservices for the cloud based game engine to instantiate the instance of the video game, wherein the set of microservices is provided an allocation of computing resources. The method including establishing communication between the cloud based game engine and each of the microservices in the set of microservices over a communication fabric. The method including executing the game logic in the instance of the video game using the cloud based game engine based on controller input associated with the game play of the player. The method including monitoring demand for computing resources while performing the executing the instance of the video game. The method including adjusting the allocation of computing resources for the set of microservices based on the demand.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
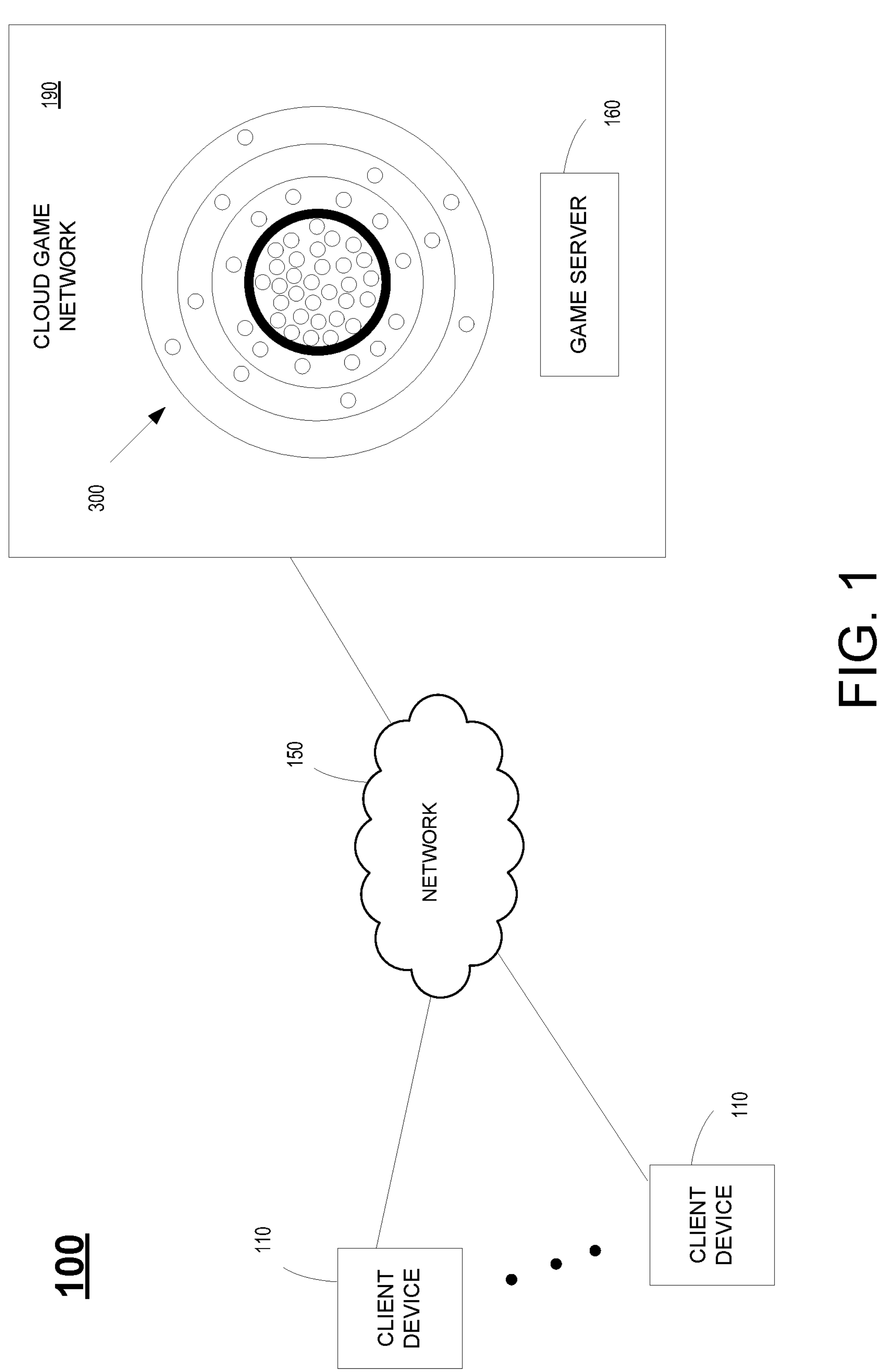
FIG. 1 illustrates a system including a cloud based game network configured to establish and implement a cloud based game engine including microservices for executing an application, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing cloud based game engines for executing applications (e.g., video games, metaverse applications, artificial intelligence, etc.), wherein a cloud base game engine is configured with microservices for executing the application. The cloud based game engine is configured to dynamically expand and contract microservices and/or an allocation of computing resource for those microservices based on a demand for computing resources determined while executing the application. Computing resources are interconnected using high speed communication fabrics in one or more data centers. For example, these communication fabrics interconnect various resources including graphics processing unit (GPU) servers, central processing unit (CPU) servers, video encoding servers, storage servers, artificial intelligence (AI) servers, etc. Depending on a current and/or predicted workload (e.g., for a video game, metaverse application, artificial intelligence, etc.), a different number of computing resources is dynamically assigned to a particular cloud based game engine executing a corresponding application. Communication paths are established between the computing resources assigned to a corresponding cloud based game engine. In that manner, the computing resources and the cloud based game engine logically form one big server. Because the hardware resources can be of any type, the cloud based game engines can execute any type of application, including video games, metaverse applications, artificial intelligence, etc. In particular, applications will be designed for the cloud based game engine of embodiments of the present disclosure. For example, computing resources for a corresponding application can be split up, wherein the cloud based game engine supporting the corresponding application may be formed using a collection of microservices located across different servers. The various different microservices may perform GPU rendering, physics operations, execution of game logic by CPUs, etc. In some embodiments, the services and/or results or output from a particular microservice may be shared between multiple game sessions for different users, such as across various online multi-player gaming sessions or a metaverse use cases.

Advantages of the methods and systems configured to implement a game cloud system and/or architecture configured to support on demand cloud based game engines, wherein computing resources can be dynamically added or removed from corresponding cloud based game engines based on corresponding workloads when executing corresponding applications, include increased processing power for applications. That is, a game engine is no longer limited by a static allocation of computing resources because a cloud based game engine can be dynamically configured with microservices based on workload when executing a corresponding application. This allows for dynamic allocation of the appropriate amount of resources that are required to execute a corresponding application. As such, instead of being designed for a single piece of hardware (e.g., gaming console executing locally or in a traditional streaming system) applications can be designed to take advantage of the power of the game cloud system of present embodiments by tapping into the horsepower of many servers or even server racks. In that manner, cloud native applications (e.g., cloud native video games) can deliver experiences not previously possible because the on demand allocation of computing resources can provide, in part, increased image quality (e.g., increased resolution), reduced latency between the cloud game system and the client device even when compared to a local gaming experience (i.e., application running on a local device). Other advantages include the design and execution of video games that are not limited to operating under existing frame rates, such that video games can be executed to produce video frames at increased frame rates, and even rates approaching unlimited frame rates. Other advantages include increased efficiency related to the utilization of resources of a data center. Because game engines are allocated computing resources based on workload (e.g., on demand allocation of computing resources), computing resources can be freed by a game engine when there is no longer a need for those computing resources, which can then be reallocated for other game engines. As a whole, the data center can maximize the use of computing resources and minimize the amount of time a computing resource sits idle.

Throughout the specification, the reference to "game" or video game" or "gaming application" is meant to represent any type of interactive application that is directed through execution of input commands. For illustration purposes only, an interactive application includes applications for gaming, word processing, video processing, video game processing, implementing a metaverse, artificial intelligence, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 including a cloud based game network 190 configured to establish and implement one or more cloud based game engines, each game engine including microservices for executing an application, in accordance with one embodiment of the disclosure. The cloud based game network 190 includes a microservices architecture 300 including a plurality of microservices, wherein a corresponding cloud based game engine is configured to dynamically expand and contract microservices and/or computing resources of the microservices based on demand while executing the application.

As shown, system 100 may provide access to application services over a network 150 for one or more client devices 110. A game server 160 may be configured to provide and manage access to a plurality of applications (e.g., video games, metaverse applications, artificial intelligence, etc.). As such, system 100 may be configured to provide gaming control to users participating in a single-player or multi-player gaming session via a cloud game network 190, wherein the cloud game network 190 is configured to provide cloud based game engines for executing video games for corresponding users playing those video games. That is, system 100 may provide gaming control to one or more users controlling one or more applications (e.g., video games, metaverse applications, artificial intelligence, etc.) through cloud based instances operating in the cloud game network 190 via network 150 in the multi-player session. Though embodiments of the present disclosure are described within the context of video gaming; of course, system 100 may provide access to services provided by any type of application, as previously described. In addition, network 150 may include one or more communication technologies, including $5^{th}$ Generation (5G) network technology having advanced wireless communication systems (e.g., cellular network technology).

In some embodiments, the cloud game network 190 may include a plurality of virtual machines (VMs) running on a hypervisor of a host machine, with one or more virtual machines configured to establish and implement one or more game engines using microservices accessed through the microservices architecture 300. Each of the cloud based game engines utilize hardware resources available to the hypervisor of the host. As previously described, the cloud based game engine is configured using microservices accessed through the microservices architecture 300 for executing corresponding applications, wherein the game engine is configured to dynamically expand and contract microservices and/or an allocation of computing resource for those microservices based on a demand based on workload, including demand for computing resources while executing the corresponding application. In that manner, access services, such as providing access to video games, can be delivered over a wide geographical area using cloud computing. Cloud computing is a style of computing in which dynamically scalable and often virtualized resources are provided as a service over the internet.

For example, game server 160 may manage a virtual machine supporting a cloud based game engine 220 that instantiates a cloud based instance of an application (e.g., video game, etc.) for a user. Moreover, the game server 160 may be configured to manage the allocation of computing resources for the cloud based game engine 220 that establishes and implements the cloud based instance 210 of the corresponding application. The application is executed by the cloud based instance at the cloud game network 190 in response to controller inputs received and forwarded by client device 110. The cloud based instance is able to render images and/or frames that are then encoded (e.g., compressed) and streamed to the corresponding client device for display. As such, a plurality of game engines managed by game server 160 as a plurality of virtual machines is configured to execute multiple instances of one or more applications associated with gameplays of a plurality of users. In that manner, cloud based server support provides streaming of media (e.g., video, audio, etc.) of gameplays of a plurality of applications (e.g., video games, gaming applications, metaverse applications, artificial intelligence, etc.) to a plurality of corresponding users. That is, game server 160 is configured to stream data (e.g., rendered images and/or frames of a corresponding gameplay) back to a corresponding client device 110 through network 150. In other embodiments, in addition to streaming video and audio (e.g., via a cloud based instance of a video game, gaming application, etc.), the back-end server (e.g., virtual instance) may be configured to exchange other types of data (i.e., other than video and audio) or data types (e.g., images, results of calculations—such as performing physics calculations, etc.), and may be configured to perform different functionalities. In one embodiment, the back-end server is configured to exchange code with the client decide, such that the client device executes the code and shares results with the back-end server. Game server 160 may be any type of server computing device available in the cloud, and may be configured as one or more virtual machines executing on one or more hosts.

Users access the remote services provided by the cloud game network 190 with client devices 110, which include at least a CPU, a display and input/output (I/O). For example, users may access cloud game network 190 via communications network 150 using corresponding client devices 110 configured for implementing cloud based game engines capable of executing applications (e.g., video games, metaverse applications, artificial intelligence, etc.), wherein a corresponding cloud based game engine includes microservices accessed through the microservices architecture 300 and is configured to expand and contract microservices and/or an allocation of computing resource for those microservices based on a demand during execution of a corresponding application. The client device 110 can be a personal computer (PC), a mobile phone, a netbook, a personal digital assistant (PAD), handheld device, etc.

In one embodiment, client device 110 may be configured as a thin client providing interfacing with a cloud based game engine of the cloud game network 190. In particular, client device 110 of a corresponding user (not shown) is configured for requesting access to applications over a communications network 150 (e.g., internet) that are executing on corresponding instances of cloud based game engines at the cloud game network 190 executing corresponding applications. In that manner, a user may be interacting through client device 110 with a corresponding cloud based instance of a game engine executing a corresponding application (e.g., video game, etc.) in association with game play of the user, such as through input commands that are used to drive the gameplay. As an illustration, client device 110 may receive input from various types of input devices, such as game controllers, tablet computers, keyboards, gestures captured by video cameras, mice, touch pads, audio input, etc. More particularly, a cloud based instance of the application is executed by a corresponding cloud based game engine of present embodiments, which is configured for generating rendered images that are then delivered over network 150 for presentation at a corresponding display in association with client device 110. That is, client device 110 is configured for receiving encoded images (e.g., encoded from game rendered images generated through execution of a video game), and for displaying the images that are rendered for display. The cloud game network 190 is able to support a plurality of applications using a plurality of cloud based game engines, each of which is selectable by the user.

In at least one capacity, the cloud game network 190 supports a multi-player gaming session for a group of users, to include delivering and receiving game data of players for purposes of coordinating and/or aligning objects and actions of players within a scene of a gaming world or metaverse, managing communications between users, etc. so that the users in distributed locations participating in a multi-player gaming session can interact with each other in the gaming world or metaverse in real-time. That is, a corresponding multi-player session involving multiple cloud based instances of the corresponding application are played (e.g., generating virtual environment, gaming world, metaverse, etc.) over the network 150 with connection to the game server 160. For a multi-player gaming session, the game server 160 or another dedicated server application (e.g., session manager) is configured to collect data from participating users, and distributes the data to other users so that all cloud based instances of the application are updated as to objects, characters, etc. to allow for real-time interaction within the virtual environment of the multi-player session.

Figure 2A:
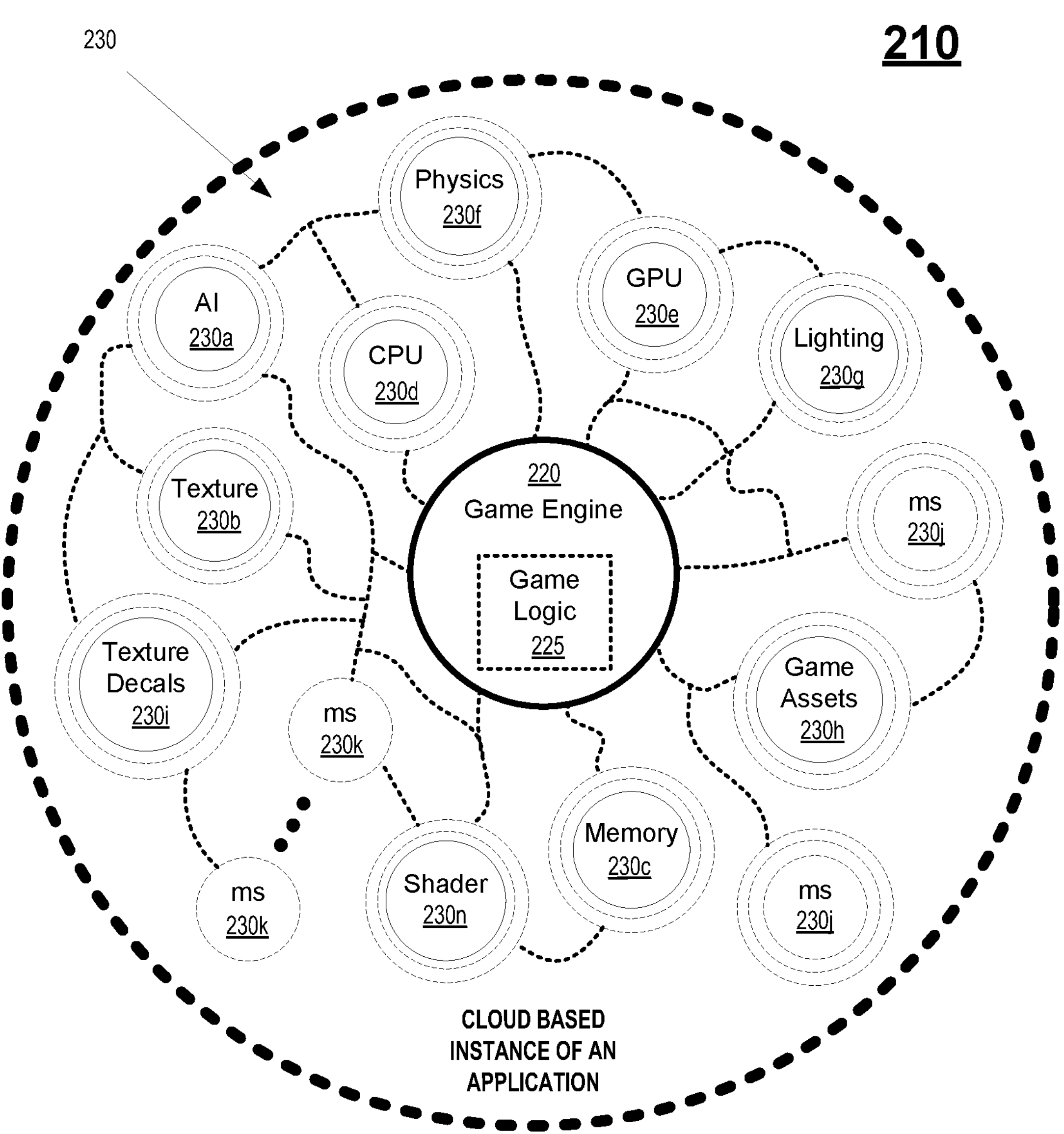
FIG. 2A illustrates a cloud based game engine dynamically configured with microservices based on load when executing an instance of a an application, in accordance with one embodiment of the disclosure.

FIG. 2A illustrates a cloud based instance 210 of an application including a cloud based game engine 220 dynamically configured with microservices based on workload experienced and/or predicted when executing the application (e.g., video game, metaverse application, artificial intelligence, etc.), in accordance with one embodiment of the disclosure. For example, the cloud based instance 210 of the application may include a plurality of microservices 230 allocated from the microservices architecture 300, wherein the cloud based instance 210 of the application is established and implemented within the cloud game network 190 of FIG. 1.

The cloud based instance 210 executes the application within the cloud game network 190. In particular, the cloud based game engine 220 of the instance 210 is configured to execute the application. For illustration, when the application is a video game, the application as game logic 225 (e.g. executable code) is executed by the cloud based game engine 220.

As shown, the cloud based instance 210 of the application may be configured as a collection or plurality of microservices 230 collaborating with each other, wherein the microservices are built on top of the game engine 220 configured to execute the game logic 225 associated with the corresponding application. Whereas a traditional application or video game was just a single 'process', a cloud based instance of a cloud native video game includes a collection of microservices (e.g. deployed through containers, virtual machines, baremetal, etc.) spanning multiple servers. In particular, the cloud based game engine is configured with microservices for executing the application (e.g., a video game, a metaverse application, artificial intelligence, etc.), and is configured to dynamically expand and contract microservices and/or an allocation of computing resource for those microservices based on demand for computing resources while executing the application. For illustration purposes only, the collection of microservices 230 may include microservices for executing the application and services associated with the application. For example, processor based functions include central processing, graphics rendering, two dimensional (2D) or three-dimensional (3D) graphics rendering, physics, physics simulation, scripting, audio, animation, graphics processing, lighting, shading, rasterization, ray tracing, shadowing, culling, transformation, artificial intelligence, video encoding, storage, artificial intelligence (AI), AI acceleration, etc. In that manner, the game engine within the cloud based instance of the application executes and implements game logic 225, perform game calculations, physics, geometry transformations, rendering, lighting, shading, audio, as well as additional in-game or game-related services. Furthermore, other services for the application as provided through one or more microservices include memory management, multi-thread management, quality of service (QoS), bandwidth testing, social networking, management of social friends, communication with social networks of friends, social utilities, communication channels, audio communication, texting, messaging, instant messaging, chat support, game play replay functions, help functions, etc.

As shown in FIG. 2A for purposes of illustration only, the collection of microservices 230 includes microservices **230*a*-230*n*, such as artificial intelligence (AI) microservice 230*a*; a texture microservice 230*b*; a storage or memory microservice 230*c*; a central processing unit (CPU) microservice 230*d*; a graphics processing unit (GPU) microservice 230*e*; a physics microservice 230*f*; a lighting microservice 230*g*; a game assets microservice 230*h*; a texture overlay or decal microservice 230*i*; shader microservices 230*l*; and other microservices 230*j*. New microservices 230*k* may be added to the collection of microservices 230 depending on workload. In addition, one or more microservices may be removed from the collection of microservices 230** based on demand for those microservices.

Each microservice includes computing resources, wherein depending on the workload for a corresponding microservice, a corresponding allocation of computing resources for that microservice may expand or contract depending on workload. For example, each of the microservices in the collection of microservices 230 is shown by a circle drawn with a solid line and two outer concentric circles drawn with dotted lines indicating that the computing resources for that microservice may expand or contract. For example, when the workload for the lighting microservice 230*g* is increased, additional computing resources performing lighting for the microservice may be added. Conversely, when the workload for the lighting microservice 230*g* is decreasing, computing resources performing lighting for the microservice may be removed, or the lighting microservice 230*g* may be removed in its entirety from the collection of microservices 230.

Figure 2B:
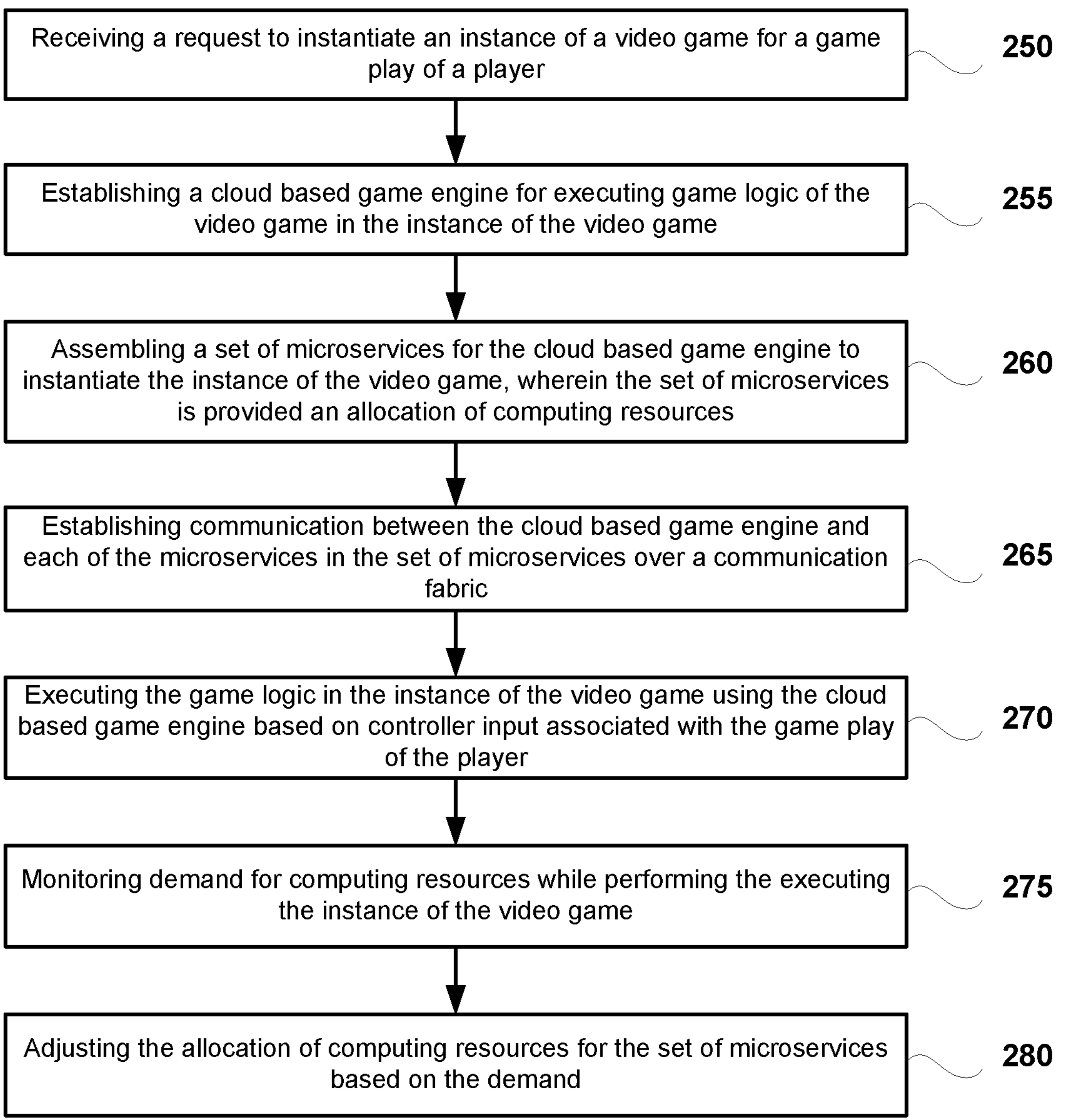
FIG. 2B is a flow diagram illustrating a method for establishing and implementing a cloud based game engine dynamically configured with microservices based on load when executing a cloud based instance of an application, in accordance with one embodiment of the disclosure.

With the detailed description of the system 100 and cloud game network 190 of FIG. 1, and the cloud based instance 210 of an application of FIG. 2A, flow diagram 200B of FIG. 2B discloses a method providing for establishing and implementing a cloud based game engine configured with microservices to execute a cloud based instance of an application, in accordance with one embodiment of the disclosure. In particular, the cloud based game engine is configured to dynamically expand and contract microservices and/or an allocation of computing resource for those microservices based on a demand for computing resources determined while executing the application.

At 250, the method includes receiving a request to instantiate a cloud based instance of an application. For example, the request may be for instantiating a cloud based instance of a video game for a game play of a player. As previously described, the request may be received by a game server of a cloud game network that is configured to establish and implement one or more cloud based game engines, each game engine including microservices for executing an application.

At 255, the method includes establishing a cloud based game engine for executing game logic (e.g., executable code) of the application. For example, the game engine may be executing game logic of a video games, wherein the cloud based game engine may be configured to provide a platform through which one or more gaming environments may be generated in the game plays of disparate video games.

At 260, the method includes assembling a set of microservices for the cloud based game engine to instantiate the instance of the application (e.g., video game), wherein the set of microservices is provided an allocation of computing resources. The set of microservices for the cloud based game engine used for executing the game logic in the instance of the video game includes at least a first microservice providing a central processing unit (CPU) functionality, a second microservice providing a graphics processing unit (GPU) functionality, and a third microservice providing memory. As previously described, the collection of microservices 230 may include microservices for executing the application and services associated with the application. For example, processor based functions include central processing, graphics rendering, 2D or 3D graphics rendering, physics simulation, scripting, audio, animation, lighting, shading, rasterization, ray tracing, shadowing, culling, transformation, AI and/or AI acceleration, video encoding, storage, etc. In that manner, computing resources for a corresponding application can be split up, wherein the cloud based game engine supporting the corresponding application may be formed using a collection of microservices located across different computing resources (e.g., servers) across one or more data centers.

In particular, the set of microservices is configurable to expand and/or contract based on the workload. That is, computing resources that are allocated to the game engine can be added or removed dynamically based on the workload. In one embodiment, computing resources may be added or removed based on the workload of a corresponding microservice. For example, when a micro service is overtaxed, computing resources may be added to support that microservice. In some embodiments, when a microservice has increased workloads, another microservice may be added that performs similar functionality. For example, another lighting microservice may be added to augment the services provided by an original lighting microservice.

At 265, the method includes establishing communication between the cloud based game engine and each of the microservices in the set of microservices over a communication fabric. In particular, microservices work together by communicating with each other through the communication fabric. For example, communication between microservices takes place across a high-speed fabric within a data center, or potentially a network across one or more data centers. That is, communication paths are formed between the microservices. In one embodiment, communication between each of the game engine and the microservices is performed using an application programming interface (API). As a result, a communication fabric is established between each of the components, including the game engine and each of the collection of microservices so that logically they form one big server, such as a virtual machine acting as a cloud based instance of an application, as previously described. In that manner, the cloud based game engine within a cloud based instance of a corresponding application may be formed using a collection of microservices (e.g., performing different services including GPU rendering, physics simulation, etc.) located across different servers (e.g., computing resources located in one or more data centers). For example, the various different microservices may perform GPU rendering, physics operations, execution of game logic by CPUs, etc.

At 270, the method includes executing the game logic in the instance of the application (e.g., video game, etc.) using the cloud based game engine. For example, execution of the game logic may be based on controller input associated with a game play of the player playing a video game. The game logic may include executable code for the application.

At 275, the method includes monitoring demand for computing resources while executing the game logic within the instance of the application (e.g., video game, etc.). That is, a current or predicted demand for computing resources can be measured and/or determined for a corresponding microservice. In some embodiments, a service monitors metrics generated during execution of the application, wherein the service pulls metrics from the system. These metrics may be based on game state data that is generated when executing game logic of a video game. In other embodiments, the application may be configured to predict demand for computing resources. That is, as the application is being executed the game code may provide information indicating when there is an expected increase in demand for computing resources (e.g., when performing a scene change, or when new graphics for a scene is compute intensive, such as when rendering moving water scenes).

At 280, the method includes adjusting the allocation of computing resources for the set of microservices based on the demand (e.g., determining workload of a corresponding microservice) that is determined. For example, when it is determined that a microservice providing a service requires more computing resources, one or more computing resources may be added to the allocation of computing resources for that microservice. In another example, the computing resource may be a microservice. In particular, when it is determined that a first microservice providing a service requires more computing resources, a second microservice providing the same service may be added to the allocation of computing resources. As an illustration, when it is determined that an application requires more resources to perform lighting (e.g., a compute intensive water scene), another lighting microservice may be added.

In addition, computing resources may also be removed from the set of microservices. For example, when it is determined that a microservice providing a service requires fewer computing resources, one or more computing resources for that microservice may be removed from the allocation of computing resources for that microservice. It may be determined that the microservice is no longer required, in which case computing resources for that microservice may be entirely removed from the allocation of computing resources for that microservice. In that manner, the microservice may also be removed from the set of microservices. In other embodiments, computing resources may be removed from the set of microservices due to increased demand for services at a corresponding data center, such as during a "busy time" for the data center when there is a peak of users and/or peak of jobs, etc. all of which lead to increased demand for resources. To support the increased demand for services computing resources that are assigned to the set of microservices may be reallocated to support the increased demand, such that execution of the application supported by the set of microservices would suffer. For example, resources would be given up from the set of microservices at the cost of image quality, speed of execution, etc.

Also, new computing resources providing new services or functionality may be added. For example, when it is determined that a new microservice that is not provided by the set of microservices is required for the execution of the application, a new microservice is added to the set of microservices. The new microservice is allocated computing resources, such as new hardware resources.

Figure 3A:
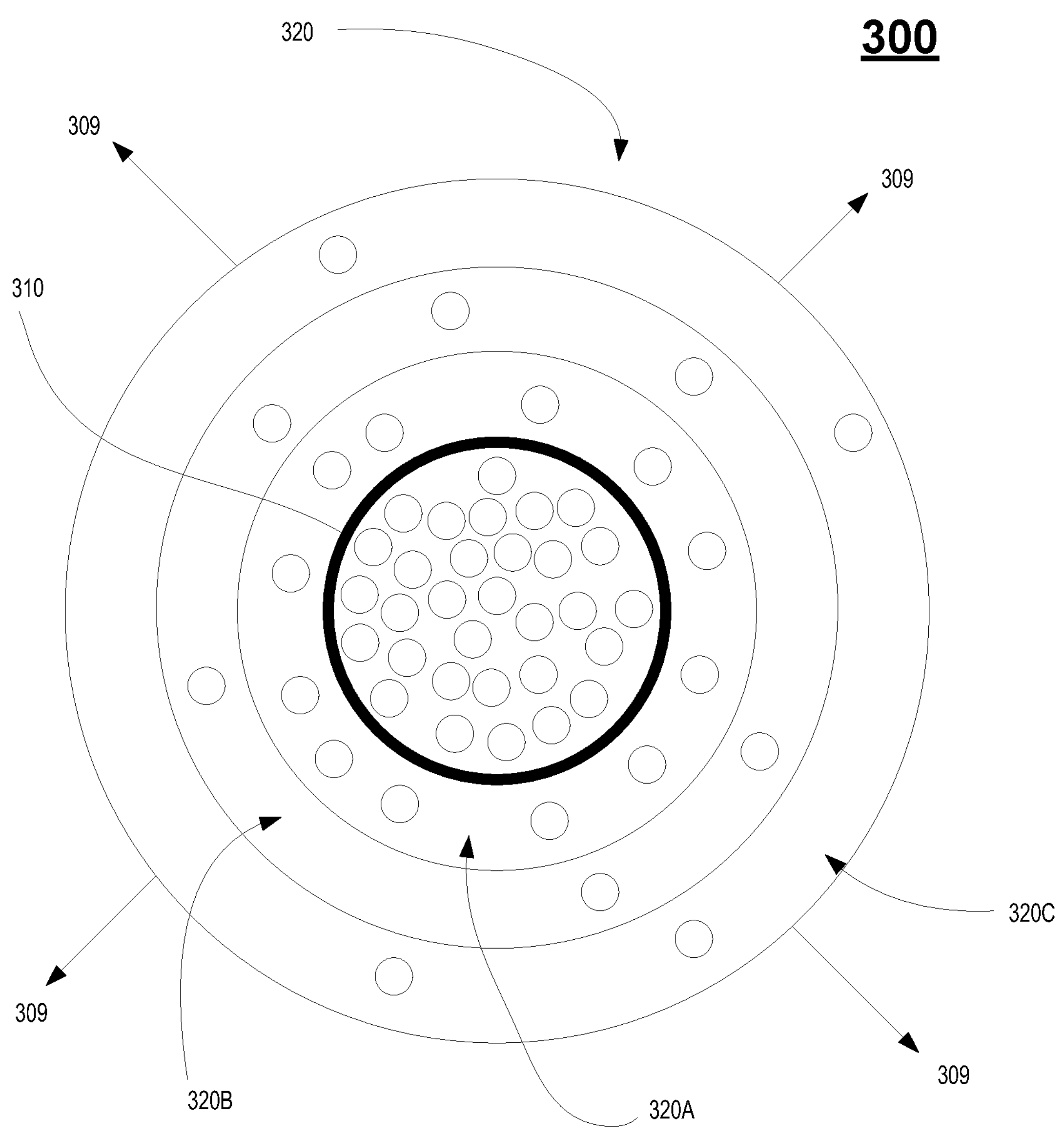
FIG. 3A illustrates a virtual microservices architecture, in accordance with one embodiment of the disclosure.

FIG. 3A illustrates a microservices architecture 300 including a plurality of microservices arranged logically across one or more data centers, in accordance with one embodiment of the disclosure. As previously introduced, the architecture 300 may include microservices for executing a corresponding application and/or services associated with the application. For example, processor based functions include central processing, graphics rendering, 2D or 3D graphics rendering, physics simulation, lighting, etc.

As shown, the microservices in the architecture 300 may be arranged in layers. For example, layer 310 may be centralized as an inner core of microservices. Various outer layers 320 may logically be formed surrounding the inner core layer 310. For instance, layer 320A is adjacent to the inner core layer 310, layer 320B is adjacent to layer 320A, and layer 320C is adjacent to layer 320B. Additional layers of microservices may be formed, as is shown by arrows 309. That is, the microservices architecture 300 may include one or more layers of microservices, including an inner core layer and outer layers.

The layers may indicate a level of priority between microservices that are available for use with a cloud instance of an application, in one embodiment. Because microservices in the inner core layer 310 have a higher priority than microservices in other layers, there may be a higher density of these microservices. For example, there may be a higher density or number of microservices in the inner core layer 310 when compared to a density or number of microservices in the adjacent layer 320A. Also, there may be a higher density of microservices in layer 320A when compared to a density or number of microservices in the adjacent layer 320B, and so on.

In one embodiment, the priority between layers may indicate a level of demand from cloud based instances of one or more applications. For example, microservices in the inner core layer 310 have a highest priority, and may indicate that these microservices are in higher demand, or are more vital than other microservices when establishing and implementing any of the cloud based instances of application. For instance, these may include microservices providing central processing, or graphics rendering, or memory. As such, microservices in successive outer layers may indicate decreasing levels of demand by the cloud based instances. The amount of microservices in successive layers may be reflective of the level of demand, as there is higher density or number of microservices in the inner core layer 310 when compared to densities or numbers of microservices of outer layers 320. Also, between successive outer layers, a layer closer to the inner core layer 310 may have a higher density or number of microservices than a layer that is further from the inner core layer 310. For example, there may be fewer microservices in layer 320C when compared to the amount of microservices in layer 320A or layer 320B.

In another embodiment, the layers may indicate a metric requirement, such as a latency requirement, such as when processing requests from an executing cloud based instance of an application. For example, microservices in the inner core layer 310 require low latencies of response, such that these microservices must provide a response quickly (e.g., to keep within a required frame rate). Other microservices in the outer layers may tolerate higher latencies of response, such that performance of these microservices is not so time critical when executing corresponding cloud based instances of applications. For example, a microservice with higher latency may include those performing quality of service analysis.

Figure 3B:
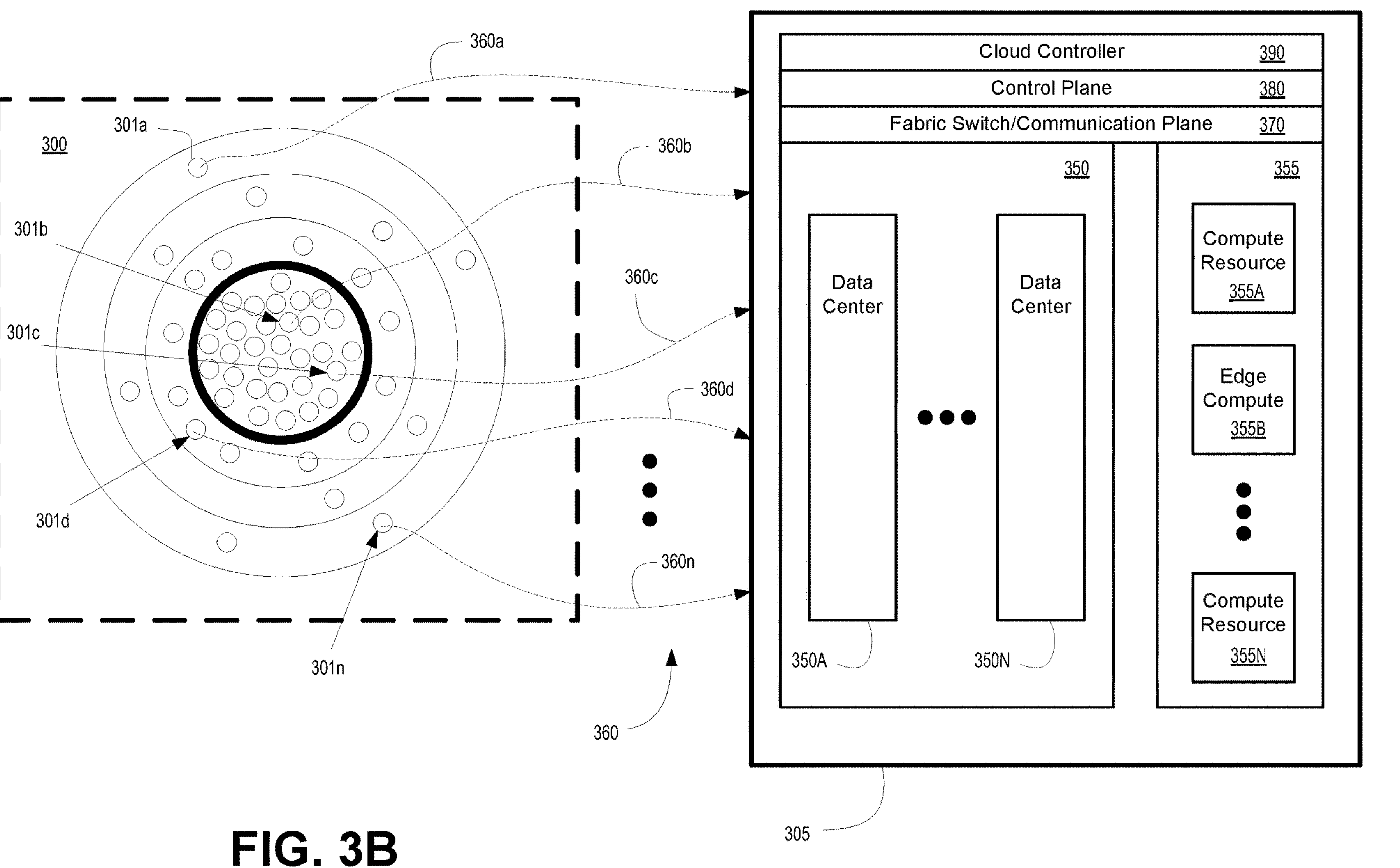
FIG. 3B illustrates the implementation of a microservices architecture using computing resources, in accordance with one embodiment of the disclosure.

FIG. 3B illustrates the implementation of a microservices architecture 300 using computing resources (e.g., hardware resources) accessible through resources architecture 305, in accordance with one embodiment of the disclosure. In particular, the microservices provided in the microservices architecture 300 may be supported by computing resources located across one or more data centers 350 (e.g., data center 350A through data center 350N) of resources architecture 305. In addition, one or more microservices may be provided by computing resources 355 (e.g., resources 355A through 355N) in resources architecture 305 that may not be located in a data center. For example, computing resource 355B may be located at an edge of a network, or located closer to an end device. In one case, the edge computing resource 355B may be a game console, or client device, that has available computing resources for use in the microservices architecture 300. In one embodiment, resources 305 providing hardware resources may be configured within the cloud game network 190 of FIG. 1.

As shown, logical microservices in the microservices architecture 300 are supported by computing resources (e.g., hardware resources) accessible through one or more data centers 350 or other computing resources 355. For example, representative connectors 360 (e.g., connectors 360*a*-360*n*) are shown between exemplary microservices in the architecture 300 and computing resources in the resources architecture 305, including the data centers 350 and/or one or more computing resources 355. For instance, connector 360*a* shows the connection between microservice 301*a* of an outer layer and hardware resources allocated to that microservice; connector 360*b* shows the connection between microservice 301*b* of an inner core layer and hardware resources allocated to that microservice; connector 360*c* shows the connection between microservice 301*c* of an inner core layer and hardware resources allocated to that microservice; connector 360*d* shows the connection between microservice 301*d* of an outer layer and hardware resources allocated to that microservice; . . . and connector 360*n* shows the connection between microservice 301*n* of an outer layer and hardware resources allocated to that microservice.

As shown, communication plane or fabric 375 is configured to communicatively connect computing resources to each other. In one embodiment, the communication plane 375 is based on a single technology (e.g., compute express link—CXL, or Peripheral Component Interconnect express—PCIe, Ethernet, Infiniband, etc.). For example, the single communication technology is used across one or more data centers or edge compute resources to enable communication between each of the computing resources. In another embodiment, the communication plane 370 can be a mixture of technologies. For example, one communication format may be used for communication between resources within a rack assembly to accommodate different performance/latency/power characteristics within a rack assembly. On the other hand, another communication format may be used for communication between resources between different rack assemblies in the same data center or different data centers because there may be different technologies interconnecting multiple rack assemblies that are compatible with the communication format.

In one embodiment, there is a common API used throughout the communication plane 375. The API may be compatible or translatable between the different communication technologies used throughout the communication plane 275. This enables hardware resources across the resources architecture 305 to communication with each other.

In particular, communication between microservices takes place across the high-speed fabric or potentially a network in the communication plane 375. In one embodiment, the physical fabric/network is shared. In another embodiment, encryption of data delivered through the communication plane 375 is performed to protect the data. This may require a method for exchanging encryption keys between microservices. Also, flow control methods may be implemented across the communication plane 375 to throttle the fabric when necessary, in another embodiment. In addition, there might be access control mechanisms like firewalls or similar mechanisms (something like virtual local area networks—VLANs) in the communication plane and/or fabric 375 preventing access between servers which should not communicate among each other, in another embodiment. Such access control mechanisms to allow connectivity between particular servers could be setup during instantiation of a cloud based instance of a corresponding application (i.e., workload startup). The end-result would be a logical fabric between only compute resources of a cloud based instance of an application which need to communicate with each other during execution of the application.

Cloud controller 390 is configured to monitor the computing resources available within the resource architecture 305, including computing resources across one or more data centers 350 and/or other computing resources 355, previously described. As such, cloud controller 390 understands the distribution of computing resources across the system 100, and further understands the distribution of computing resources for a particular cloud based instance of an application. Further, cloud controller 390 is able to track usage of each of the computing resources (e.g., active, inactive, allocated to which cloud based instance, etc.). In particular, the cloud controller 390 is able to optimally distribute computing resources providing various microservices across different rack assemblies of one or more data centers depending on a desired strategy (e.g., equal distribution of workload across data centers, minimize the input/output (I/O) load on network storage or network storage servers across one or more rack assemblies of one or more data centers, etc.

A control plane 380 or orchestration layer manages the instantiation and allocation of computing resources for each of a plurality of cloud based instances of multiple applications. In one embodiment, the control plane 380 provides functionality similar to the game server 160.

In one embodiment, the combination of the cloud controller 390, which understands the distribution and use of computing resources across the resource architecture 305, and the control plane 380, which manages the allocation of computing resources for the instantiation and implementation of a plurality of cloud based instances of multiple applications, has an understanding of the overall resources in a given data center and across multiple data centers of resource architecture 305, such as which microservices and computing resources are located at which rack assemblies across one or more data centers. When a new workload arises (e.g. a new cloud native game being started as a cloud based instance of an application, or an existing and large online world has a need for additional resources, etc.), the cloud controller 390 and/or the control plane 380 are configured to decide accordingly which computing resources to allocate in support of a corresponding cloud based instance of an application.

In addition, the cloud controller 390 and/or the control plane 380 can be configured for transferring jobs between computing resources and/or microservices that are located across different rack assemblies and/or data centers. For example, one rack assembly providing a microservice may be overtaxed, and as such, the job being performed by that microservice could be transferred to another microservice on a different rack assembly in the same data center or different data center to perform the same job in support of the same cloud based instance of a corresponding application. In other examples, a rack assembly providing a microservice may be undergoing maintenance (e.g., routine scheduling, emergency scheduling, etc.), or the rack assembly may be brought off-line due to failing hardware, or to perform preventative maintenance (on a determined schedule) that are triggered by known conditions, such as when one or more servers are overheating, one or more hard drives are failing, one or more operating systems are failing, etc.). In some embodiments, a cloud native application may be configured as a persistent application, such that the application would never "go down" and should be resilient under any and all conditions. In such a case, the cloud native application that is persistent would transfer functionalities performed by a failing microservice to another microservice performing the same functions, including the transfer of required data. In that manner, microservices (e.g., failing) for a corresponding application can be exchanged and/or interchanged and/or replaced with other microservices, without any noticeable degradation in performance during execution of the application.

Figure 3C:
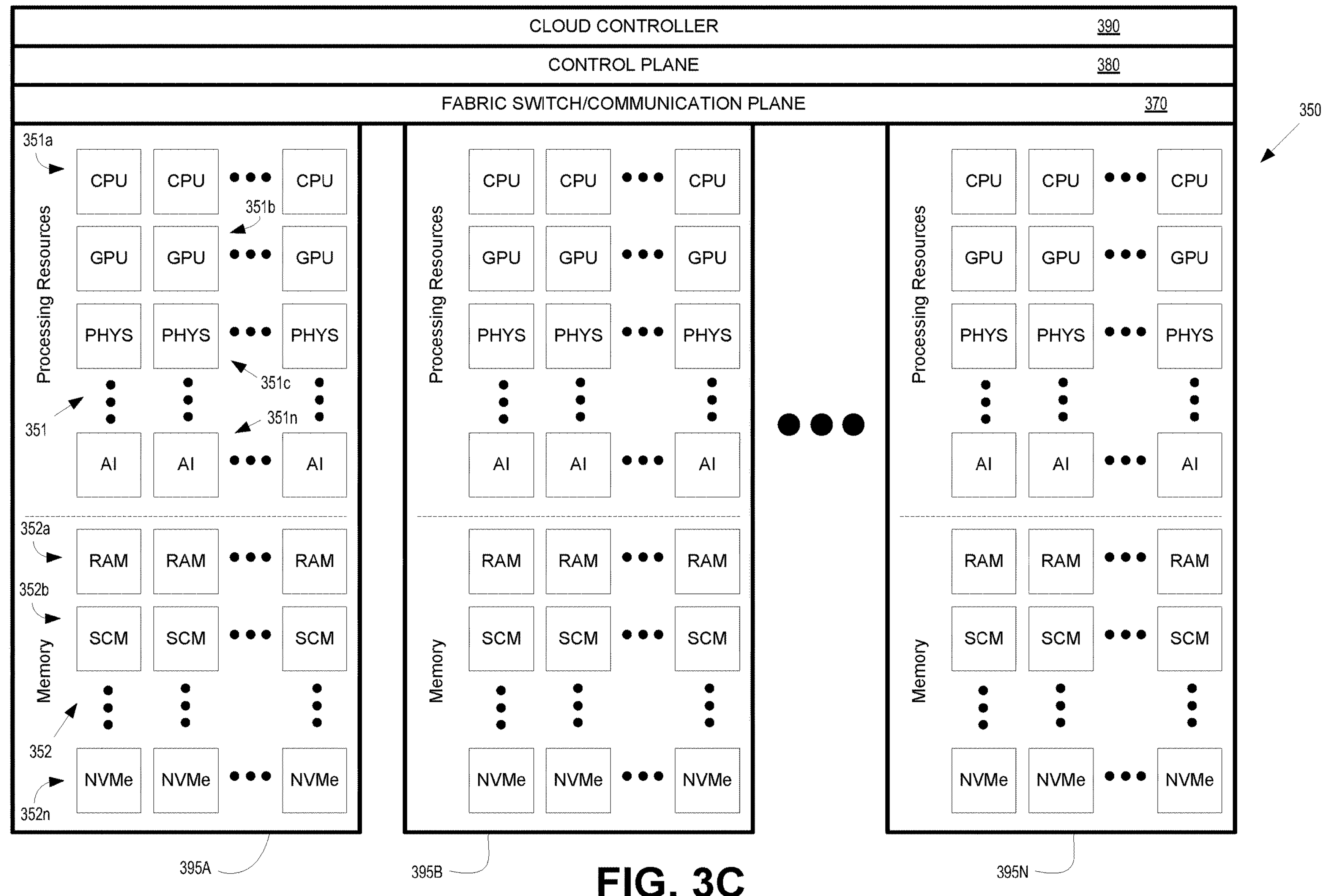
FIG. 3C illustrates a data center including computing resources supporting a microservices architecture, in accordance with one embodiment of the disclosure.

FIG. 3C illustrates computing resources supporting a microservices architecture (e.g., logical microservices architecture 300, or resource architecture 305) that may be configured across one or more data centers 350 and/or other network locations (e.g., edge compute), in accordance with one embodiment of the disclosure. For purposes of illustration and ease of understanding, the computing resources shown in FIG. 3C are located within one data center 350.

As shown, the distribution of computing resources across a resources architecture (e.g., one or more data centers, etc.) provides a "disaggregated hardware platform" to support cloud based game engines for executing applications (e.g., video games, metaverse applications, artificial intelligence, etc.), wherein a cloud base game engine is configured with microservices for executing the corresponding application, and wherein the cloud based game engine is configured to dynamically expand and contract microservices and/or an allocation of computing resource for those microservices based on a workload and/or demand for those computing resources during execution of a corresponding application. In one implementation, the distribution of computing resources is configured for purposes of video gaming.

In particular, embodiments of the present disclosure provide a resource platform that offers different types of compute (e.g., CPU, GPU, storage, video encoders and other types of resources), which can be stitched together dynamically based on resource needs for workloads supporting one or more cloud based instances of multiple applications, including gaming. For example, data center 350 includes one or more rack assemblies, including rack assembly 395A, 395B, . . . 395N. Computing resources in each rack assembly may be disaggregated to accommodate the different resources needed by the different instances of applications that are executing. For example, rack assembly 395A is representative of rack assemblies in the data center, and includes a group of computing resources 351 providing processing functionality, and a group of computing resources 352 providing memory. For example, group of computing resources 351 includes computing resources 351*a* through 351*n*. For purposes of illustration only, each of computing resources 351*a* may provide central processing services; each of computing resources 351*b* may provide graphics processing services; each of computing resources 351*c* may provide physics simulation services; . . . and each of computing resources 351*n* may provide artificial intelligence services. In addition, the group of computing resource 352 includes computing resources 352*a* through 352*n*. For purposes of illustration only, each of computing resources 352*a* is configured to provide random access memory (RAM) services; each of computing resources 352*b* is configured to provide storage class memory (SCM); . . . and each of computing resource 352*n* is configured to provide non-volatile memory express (NVMe). Different rack assemblies 395A-395N in the data center 350 have similar groupings of computing resources, but with different distribution of those computing resources. As previously described, the overall fabric of communication plane 370 may be based on a single technology (e.g., CXL, PCIe, etc.), but may also be a mixture of technologies within a rack assembly and/or between rack assemblies.

As shown, high-speed, low-latency interconnects in the fabric switch and/or communication plane 370 provides interconnections and communications between components of a single rack assembly and components between rack assemblies 395A-395N of the data center 350. For example, the interconnects provide high speed communication between the various microservices supported by the hardware resources in the rack assemblies 395A-395N (e.g. CPUs, GPUs, AI accelerators, RAM, storage class memory, NVMe, video encoders, FPGAs, etc.) within a rack assembly and between rack assemblies of the data center 350.

As previously described, the cloud controller 390 and/or the control plane 380 work cooperatively to manage allocation of computing resources in support of corresponding cloud based instances of one or more applications. In one embodiment, a workload of a microservice spans just a few compute resources in a rack assembly, but in other embodiments, the workload of a microservice or of the various microservices supporting a cloud based instance of a corresponding application may span many servers, rack assemblies, and even across different data centers. For example, the cloud native game that is supported by the cloud game network providing microservices may be a collection of microservices (e.g., deployed through containers, virtual machines, or baremetal) that span multiple servers, wherein the microservices may provide graphics rendering, physics simulation, central processing, handling game state, etc.

In one embodiment, resource fragmentation may occur across rack assemblies and/or data centers. This fragmentation may prevent the right mix of compute resources for a job to be available across a rack assembly, whereas across all the rack assemblies of a data center level there are plenty of computing resources. As such, the computing resources would need to be defragmented (e.g., like in hard drives) by moving jobs (work) between servers/rack assemblies to free up computing resources on a rack assembly. Moving jobs may involve live migration and/or transparent migration of services with the cooperation of those services. In some embodiments, when a high priority job is requested, that job may require compute resources that are allocated to another workload having lower priority. This may occur when the higher priority job brings in more revenue (e.g. higher paying user). As a result, the workload receiving fewer resources may have to reduce its complexity or fidelity in some type of way. In other embodiments, a data center may be configured with different generations of hardware e.g. with reduced performance or features. In that case, jobs may get migrated to such hardware, which might be cheaper to operate or to another data center with lower costs (e.g. lower power costs).

Figure 4:
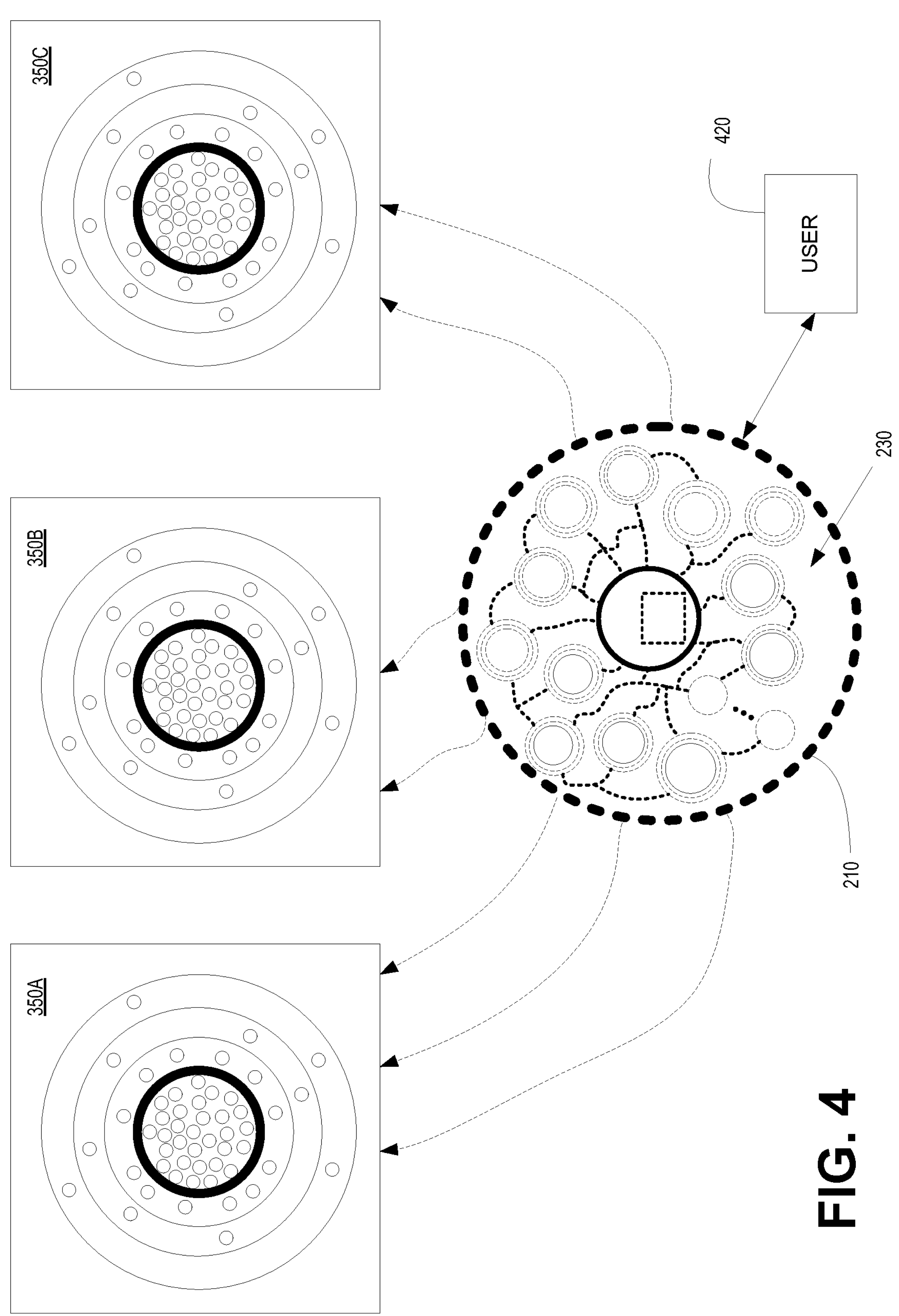
FIG. 4 illustrates a cloud based game engine executing an instance of an application including computing resources located across one or more data centers, in accordance with one embodiment of the disclosure.

This defragmentation of computing resources may occur in other use cases. Just as in the case of moving jobs to other rack assemblies due to defragmentation, similar operations of moving jobs between rack assemblies of one or more data centers may happen in other cases, such as maintenance or in case of dying hardware. These capabilities allow for the achievement of high availability (uptime) of computing resources, and are critical to achieve high uptime for large metaverse applications and/or massively multi-player online gaming (MMO) gaming experiences which span many users FIG. 4 illustrates a cloud based game engine executing an instance 210 of an application (e.g., video game etc.) including computing resources located across one or more data centers, in accordance with one embodiment of the disclosure. As previously described, although the computing resources are shown located at one or more data centers, one or more computing resources supporting microservices may be located outside of a data center, such as personal computers (PCs), laptops, network attached storage (NAS), other hardware, etc. In some embodiments, the computing resources are located in a home of a corresponding user associated with the application that is executing using, in part, the local computing resources (e.g., with communication to the other microservices of the application, and support services). In other embodiments, the computing resources are located in remote locations (i.e., remote from the home of a corresponding user associated with the application that is executing, using, in part, the remote computing resources (e.g., with communication to the other microservices of the application, and support services). As shown, the cloud based instance 210 of an application as controlled by a user 420 includes a plurality of micro services 230 in collaboration with each other. Each of the microservices need to be started or be supported with computing resources (e.g., hardware), wherein the computing resources of the microservices 230 may be located across one or more data centers, such as data center 350A, data center 350B, and data center 350C. This is shown by dotted lines between the cloud based instance 210 of the application, and the data centers 350A, 350B, and 350C.

In one embodiment, using the control plane 380 and information from the cloud controller 390, the control plane 380 is configured to assign a variety of computing resources of one or more microservices based on the needs of the workload experienced by execution of the cloud based instance 210 of the application. The needs may be based on compute and storage requirements of the application, which may be provided through a file, a database or some other resource. The needs may be based on whatever auxiliary resources are needed to provide cloud streaming, video encoding, AI and other capabilities in order to realize a cloud gaming experience.

The microservices need the ability to work together, and would need a way to find each other in order to establish communication paths between the microservices. In one embodiment, the control plane 380 is configured to assign a list of servers (i.e., computing resources of the same or other microservices) a particular microservice can communicate and work cooperatively with. In another embodiment, the microservices can locate each other dynamically, such as by broadcasting identifiers, or using a unique session identifier (e.g., SessionID), etc.

As a result, once all the micro-services are started for a corresponding cloud based instance of an application (e.g., video game, etc.), the gaming workload can begin. A corresponding client would send input (e.g. game controller button presses, keyboard presses, webcam, microphone) to a cloud gaming server configured to provide a cloud based instance of the application using dynamically configured microservices. In this case, that data may need to be sent to a variety of microservices across one or more data centers. In one embodiment, there is some service (e.g., the game server, or control plane 380, etc.) the cloud based instance talks to, which is configured to distribute this information to corresponding microservices subscribed to this type of data (i.e., microservices for a particular cloud based instance of an application). For a gaming application as an example, the output of a game is ultimately (encoded) audio, video and game controller rumble data (and may be other data types). This may be sent over individual communication channels to a client device (e.g., the client may perceive e.g. a single IP address), or collected by the previously described service (e.g., game server, control plane 380, etc.) which manages connection to a client device.

For example, a cloud native gaming environment, implemented by embodiments of the present disclosure, differs significantly from a classic cloud gaming environment. In the classic setup, there was a single server running one or more games that would stream the output from a single GPU to a client device of a user. In embodiments of the present disclosure, for the execution of a corresponding cloud native application via a cloud based instance of the application, there might be multiple GPUs that are involved using different microservices across one or more rack assemblies of one or more data centers. Each GPU may be configured to handle a different section of a video frame, or even a different video frame. These frames could be collected by a single video encoder which combines the information to form a single stream, but each portion could also be encoded independently across multiple video encoders and thus separate streams would need to be combined at the client side.

Figure 5:
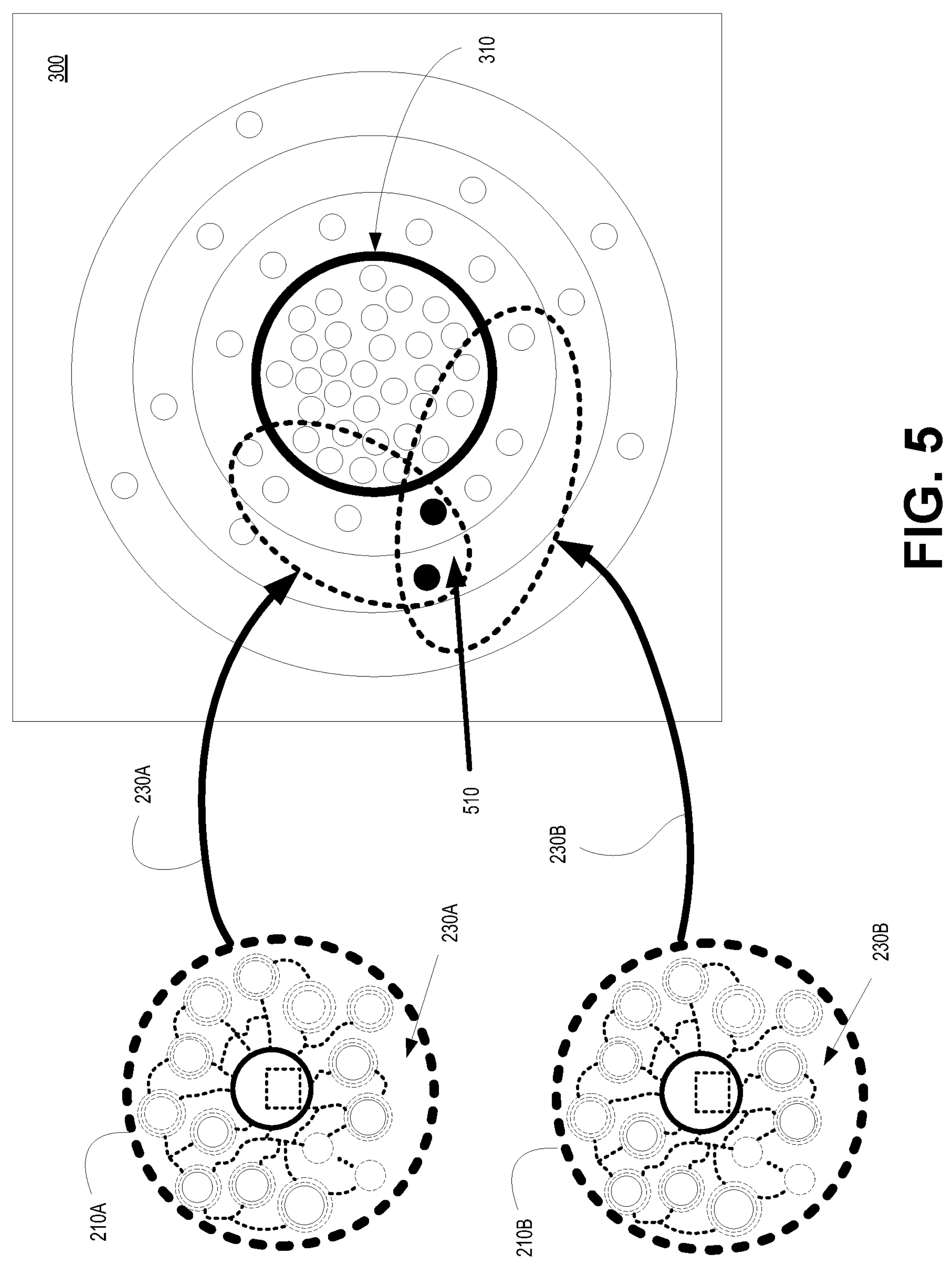
FIG. 5 illustrates the sharing of resources between two or more cloud based game engines, each executing a corresponding instance of a corresponding application, in accordance with one embodiment of the disclosure.

FIG. 5 illustrates the sharing of resources between two or more cloud based game engines, each executing a corresponding instance of a corresponding video game, in accordance with one embodiment of the disclosure. As shown, cloud based instance 210A of an application includes a plurality of microservices 230A located within the microservices architecture 300. Core microservices within the plurality of microservices 230A are located within the inner core of microservices 310 of the microservices architecture 300. In addition, cloud based instance 210B of another application or the same application includes a plurality of microservices 230B located within the microservices architecture 300. Core microservices within the plurality of microservices 230B are located within the inner core of microservices 310 of the microservices architecture 300.

Microservices or information from those microservices may be shared between the cloud based instances 210A and 210B. For purposes of illustration, microservices or information from those microservices 510 may be shared. As an example, an object may be used for two different game plays of the same application (e.g., video game, etc.). The rendering of that object may be shared between the two game plays, even though the object was only rendered once. That is, the object may be rendered by cloud based instance 210A, but the rendered object may be shared with the cloud based instance 210B. In another example, lighting services for a video game may be shared. For instance, a lighting microservice configured to perform lighting based on a fixed set of light sources determined when executing a first instance of a video game (i.e., supporting a first game play) may be shared by a second instance of the video game (i.e., supporting a second game play). That is, the second instance of the video game may execute the lighting microservice to generate a scene, wherein the lighting microservice was initially configured to support the first instance of the video game.

In embodiments of the present disclosure, game rendering can be performed at much higher frame rates. For example, execution of a cloud based instance of an application need not be restricted to a particular frame rate (e.g., 60 frames per second, etc.), as is traditionally required, wherein the frame rate may be tied to the refresh rate of the display used. This gives a rendering engine 16.7 milliseconds to generate an image frame, which corresponds to a 60 Hz refresh rate. However, for the cloud based instance of an application, rendering can be performed across many GPUs of multiple microservices. As such, it is conceivable that the image frame may be generated in 1 millisecond, which may help to reduce latency when streaming. In such a case, the remaining 15 milliseconds might be used for other workloads, such as when the hardware supports some type of time sharing of computing resources between different workloads.

Accordingly, in various embodiments the present disclosure describes a cloud based game engine configured with microservices for executing an application (e.g., a video game, a metaverse application, artificial intelligence, etc.), wherein the cloud based game engine is configured to dynamically expand and contract microservices and/or an allocation of computing resource for those microservices based on a demand for computing resources determined while executing the video game.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a microservice, server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include $5^{th}$ Generation (5G) network technology having advanced wireless communication systems. 5G is the fifth generation of cellular network technology. The 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for cloud gaming, comprising:

receiving a request to instantiate an instance of a video game for a game play of a player;

establishing a cloud based game engine for executing game logic of the video game in the instance of the video game;

assembling a set of microservices located across one or more servers for the cloud based game engine to instantiate the instance of the video game, wherein the set of microservices is provided an allocation of computing resources;

establishing communication between the cloud based game engine and each microservice in the set of microservices over one or more communication fabrics;

executing the game logic in the instance of the video game using the cloud based game engine based on controller input associated with the game play of the player;

monitoring real-time demand for computing resources in the allocation of computing resources while performing the executing the game logic in the instance of the video game for the game play of the player;

adjusting the set of microservices located across the one or more servers and the allocation of computing resources for the adjusted set of microservices based on detecting a change of a game state indicative of the real-time demand changing in response to a scene in the game play; and adjusting communication between the cloud based game engine and each microservice in the adjusted set of microservices over the one or more communication fabrics.

2. The method of claim 1, wherein the set of microservices for the cloud based game engine and the allocation of computing resources for the set of microservices dynamically expands and contracts based on the demand for the computing resources that is determined.

3. The method of claim 1, wherein the communication between each of the cloud based game engine and the set of microservices is performed using an application programming interface (API).

4. The method of claim 1, wherein the monitoring demand includes:

determining that a first microservice providing a first service requires more computing resources, wherein the first microservice has a first allocation of computing resources; and adding a first computing resource to the first allocation of computing resources.

5. The method of claim 4, wherein the first computing resource includes a second microservice providing the first service, wherein the second microservice is provided a second allocation of computing resources.

6. The method of claim 1, wherein the monitoring demand includes:

determining that a first microservice providing a first service requires fewer computing resources, wherein the first microservice has a first allocation of computing resources; and removing at least one computing resource from the first allocation of computing resources.

7. The method of claim 6, further comprising:

removing all the computing resource from the first allocation of computing resources; and removing the first microservice from the set of microservices.

8. The method of claim 1, wherein the monitoring demand includes:

determining while performing the executing the game logic in the instance of the video game that the game logic requires a new service not provided by the set of microservices; and adding a first microservice providing the new service to the set of microservices, wherein the first microservice has first allocation of computing resources.

9. The method of claim 1, wherein the set of microservices for the cloud based game engine used for executing the game logic in the instance of the video game includes at least a first microservice providing a central processing unit (CPU) functionality, a second microservice providing a graphics processing unit (GPU) functionality, and a third microservice providing memory.

10. A non-transitory computer-readable medium storing a computer program for performing a method, the computer-readable medium comprising:

program instructions for receiving a request to instantiate an instance of a video game for a game play of a player;

program instructions for establishing a cloud based game engine for executing game logic of the video game in the instance of the video game;

program instructions for assembling a set of microservices located across one or more servers for the cloud based game engine to instantiate the instance of the video game, wherein the set of microservices is provided an allocation of computing resources;

program instructions for establishing communication between the cloud based game engine and each microservice in the set of microservices over one or more communication fabric;

program instructions for executing the game logic in the instance of the video game using the cloud based game engine based on controller input associated with the game play of the player;

program instructions for monitoring real-time demand for computing resources in the allocation of computing resources while performing the executing the game logic in the instance of the video game for the game play of the player;

program instructions for adjusting the set of microservices located across the one or more servers and the allocation of computing resources for the adjusted set of microservices based on detecting a change of a game state indicative of the real-time demand changing in response to a scene in the game play; and program instructions for adjusting communication between the cloud based game engine and each microservice in the adjusted set of microservices over the one or more communication fabrics.

11. The non-transitory computer-readable medium of claim 10, wherein in the method the set of microservices for the cloud based game engine and the allocation of computing resources for the set of microservices dynamically expands and contracts based on the demand for the computing resources that is determined.

12. The non-transitory computer-readable medium of claim 10, wherein the program instructions for monitoring demand includes:

program instructions for determining that a first microservice providing a first service requires more computing resources, wherein the first microservice has a first allocation of computing resources; and program instructions for adding a first computing resource to the first allocation of computing resources.

13. The non-transitory computer-readable medium of claim 10, wherein the program instructions for monitoring demand includes:

program instructions for determining that a first microservice providing a first service requires fewer computing resources, wherein the first microservice has a first allocation of computing resources; and program instructions for removing at least one computing resource from the first allocation of computing resources.

14. The non-transitory computer-readable medium of claim 13, further comprising:

program instructions for removing all the computing resource from the first allocation of computing resources; and program instructions for removing the first microservice from the set of microservices.

15. The non-transitory computer-readable medium of claim 10, wherein the program instructions for monitoring demand includes:

program instructions for determining while performing the executing the game logic in the instance of the video game that the game logic requires a new service not provided by the set of microservices; and program instructions for adding a first microservice providing the new service to the set of microservices, wherein the first microservice has first allocation of computing resources.

16. A computer system comprising:

a processor;

memory coupled to the processor and having stored therein instructions that, if executed by the computer system, cause the computer system to execute a method, comprising:

receiving a request to instantiate an instance of a video game for a game play of a player;

establishing a cloud based game engine for executing game logic of the video game in the instance of the video game;

assembling a set of microservices located across one or more servers for the cloud based game engine to instantiate the instance of the video game, wherein the set of microservices is provided an allocation of computing resources;

establishing communication between the cloud based game engine and each microservice in the set of microservices over one or more communication fabric;

executing the game logic in the instance of the video game using the cloud based game engine based on controller input associated with the game play of the player;

monitoring real-time demand for computing resources in the allocation of computing resources while performing the executing the game logic in the instance of the video game for the game play of the player;

adjusting the set of microservices located across the one or more servers and the allocation of computing resources for the adjusted set of microservices based on detecting a change of a game state indicative of the real-time demand changing in response to a scene in the game play; and adjusting communication between the cloud based game engine and each microservice in the adjusted set of microservices over the one or more communication fabrics.

17. The computer system of claim 16, wherein in the method the set of microservices for the cloud based game engine and the allocation of computing resources for the set of microservices dynamically expands and contracts based on the demand for the computing resources that is determined.

18. The computer system of claim 16, wherein in the method the monitoring demand includes:

determining that a first microservice providing a first service requires more computing resources, wherein the first microservice has a first allocation of computing resources; and adding a first computing resource to the first allocation of computing resources.

19. The computer system of claim 16, wherein in the method the monitoring demand includes:

determining that a first microservice providing a first service requires less computing resources, wherein the first microservice has a first allocation of computing resources; and removing at least one computing resource from the first allocation of computing resources.

20. The computer system of claim 16, wherein in the method the monitoring demand includes:

determining while performing the executing the game logic in the instance of the video game that the game logic requires a new service not provided by the set of microservices; and adding a first microservice providing the new service to the set of microservices, wherein the first microservice has first allocation of computing resources.

* * * * *